(12) United States Patent
Kramer et al.

(10) Patent No.: US 9,588,950 B2
(45) Date of Patent: Mar. 7, 2017

(54) ASSIGNMENT OF MEASUREMENT DATA TO INFORMATION DATA

(75) Inventors: Martin Kramer, Erlangen (DE); Sascha Seifert, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1058 days.

(21) Appl. No.: 13/370,348

(22) Filed: Feb. 10, 2012

(65) Prior Publication Data

US 2012/0210204 A1    Aug. 16, 2012

(30) Foreign Application Priority Data

Feb. 11, 2011   (EP) .................................... 11154138
Dec. 21, 2011   (EP) .................................... 11194932

(51) Int. Cl.
| | | |
|---|---|---|
| G06F 17/21 | (2006.01) | |
| G06F 17/24 | (2006.01) | |
| G06F 17/22 | (2006.01) | |
| G06F 17/30 | (2006.01) | |

(52) U.S. Cl.
CPC ........ *G06F 17/241* (2013.01); *G06F 17/2235* (2013.01); *G06F 17/30244* (2013.01); *G06F 17/30734* (2013.01)

(58) Field of Classification Search
CPC ............ G06F 19/321; G06F 17/30734; G06F 19/345; G06F 19/3487; G06F 19/322; G06F 19/3443; G06F 17/30247; G06F 17/241; G06F 17/2235; G06F 17/30244
See application file for complete search history.

(56) References Cited

U.S. PATENT DOCUMENTS

| | | | |
|---|---|---|---|
| 7,028,038 B1* | 4/2006 | Pakhomov | .................... 707/765 |
| 8,498,870 B2* | 7/2013 | Brandt | ........................ 704/270.1 |
| 8,786,601 B2* | 7/2014 | Lehmann et al. | ............. 345/427 |
| 2005/0097628 A1* | 5/2005 | Lussier et al. | ................. 800/260 |
| 2006/0020444 A1* | 1/2006 | Cousineau et al. | ............... 704/1 |
| 2007/0005621 A1* | 1/2007 | Lesh et al. | ..................... 707/101 |

(Continued)

OTHER PUBLICATIONS

S. Seifert et al.,"Hierachical Parsing and Semantic Navigation of Full Body CT Data", Proceddings of the SPIE, vol. 7259, pp. 725902-725910 (2009); Others; 2009.

(Continued)

*Primary Examiner* — Wilson Tsui
(74) *Attorney, Agent, or Firm* — Harness, Dickey & Pierce, P.L.C.

(57) ABSTRACT

A method is disclosed for assigning measurement data of a body of a patient to information data related to the same body. The method includes providing annotated measurement data, providing annotated information data, translating the first group of annotations into a first group of universal annotations and the second group of annotations into a second group of universal medical annotations in a universal annotation ontology management system, comparing the universal annotations of the first group of universal annotations with the universal annotations of the second group of universal annotations, and assigning the universal annotations to each other. An assignment system and a universal annotation ontology management system are also disclosed.

14 Claims, 3 Drawing Sheets

(56) References Cited

U.S. PATENT DOCUMENTS

| | | | | |
|---|---|---|---|---|
| 2008/0052126 | A1* | 2/2008 | Sasai et al. ................... | 705/3 |
| 2009/0077094 | A1* | 3/2009 | Bodain ....................... | 707/10 |
| 2010/0115436 | A1* | 5/2010 | Embley et al. .............. | 715/763 |
| 2010/0131516 | A1* | 5/2010 | Jean-Mary .................. | 707/749 |
| 2011/0035206 | A1* | 2/2011 | Hale et al. .................... | 704/2 |
| 2011/0153539 | A1* | 6/2011 | Rojahn ........................ | 706/50 |
| 2012/0014559 | A1* | 1/2012 | Suehling ............. | G06K 9/6207 382/103 |
| 2012/0066241 | A1* | 3/2012 | Geller et al. ................. | 707/758 |
| 2014/0149407 | A1* | 5/2014 | Qian ................... | G06F 19/321 707/737 |

OTHER PUBLICATIONS

Channin DS, Mongkolwat P, Kleper V, Sepukar K, Rubin DL. "The caBIG Annotation and Image Markup Project." J Digit Imaging. Published online Mar. 18, 2009. Accessed Aug. 11, 2009; Others.

Möller, M.; Regel, S. & Sintek, M.RadSem: Semantic Annotation and Retrieval for Medical Images Proc. of the 6th Annual European Semantic Web Conference (ESWC2009). 2009; Others.

Möller M. et al., "Medical Image Understanding Through the Integration of Cross-Modal Object Recognition With Formal Domain Knowledge", Proceeding of HEALTHINF, vol. 1, Funchal. Madeira, Portugal. pp. 134-141, 2008; Others.

Pinar Wennerberg: "Aligning Medical Domain Ontologies for Clinical Query Extraction", Proceedings of the 12th Conference of the European Chapter of the Association for Computational Linguistics: Student Research Workshop, Apr. 2, 2009, Athens, Greece, Retrieved from Internet: URL:http://delivery.acm.org/10.1145/1610000/1609189/p79-wennerberg.pdf; Others.

Pinar Wennerberg et al: "Kemm: A Knowledge Engineering Methodology in the Medical Domain (Slides)", 5 th International Conference on Formal Ontology in Information Systems, Oct. 31, 2008, Saarbrücken, Germany, Retrieved from the Internet: URL:http://fois08.dfki.de/presentations/FOIS2008-Wennerberg.pdf; Others.

Jun Zhao et al: "Semantically linking and Browsing Provenance Logs for E-sciene", First International IFIP Conference. ICSNW 2004, Jun. 17, 2004, pp. 158-176, Paris, France Retrieved from Internet: URL:http://www.springerlink.com/content/b8gb1b3k5kr3w5n1/; Others.

Bui A A T et al: "Timeline: Visualizing Integrated Patient Records", IEEE Transactions on Information Technology in Biomedicine, IEEE Service Center, Los Alamitos. CA, US, vol. 11, No. 4, Jul. 1, 2007. pp. 462-473; Others.

Sean Bechhofer et al: "Using Ontologies and Vocabularies for Dynamic Linking". IEEE Internet Computing, IEEE Service Center, New York, NY, US, vol. 12, No. 3, May 1, 2008. pp. 32-39; Others.

Bechhofer S K et al: "GOHSE: Ontology driven linking of biology resources", WEB Semantics: Science, Services and Agents on the world wide web, Elsevier, Amsterdam, NL, vol. 4, No. 3, Sep. 1, 2008, pp. 155-163; Others.

Aleksovski Z. et al. "Matching Unstructured Vocabularies Using a Background Ontology." *Managing Knowledge in a World of Networks—Lecture Notes in Computer Science,* Springer, Berlin, DE; pp. 182-197; XP019045770; ISBN: 978-3-540-46363-4; 2006.

European Office Action dated Jan. 22, 2016 for corresponding EP Application No. 11194932.7.

* cited by examiner

FIG 2

FIG 3

ASSIGNMENT OF MEASUREMENT DATA TO INFORMATION DATA

PRIORITY STATEMENT

The present application hereby claims priority under 35 U.S.C. §119 to European patent application numbers EP11154138 filed Feb. 11, 2011, and EP11194932 filed Dec. 21, 2011, the entire contents of each of which are hereby incorporated herein by reference.

FIELD

At least one embodiment of the present invention is generally directed to a method and/or an assignment system for assigning
measurement data of a body of a patient, the measurement data having been accumulated by a first medical imaging system
to information data related to the same body or vice versa.

At least one embodiment of the present invention is also generally directed to a universal annotation ontology management system for that purpose.

BACKGROUND

Measurement data of a body of a patient, i.e. of an animal, in particular a human, preferably a living being, are accumulated by medical imaging systems such as (amongst others) computer tomographs (CTs), magnetic resonance tomographs (MRs), common X-ray devices, ultrasound imaging systems or the like. It can thus be concluded that such measurement data are all acquired by automatic machines which are controlled by experts but which acquire the measurement data based on a technical logic of their own. Accordingly, the measurement data themselves have an inherent logic in themselves, concerning both their data structure and the form of reports in which they are presented.

The interpretation of such measurement data, i.e. image data, is then performed by a radiologist and possibly by other experts such as the medical practitioner who decides on the diagnosis and/or treatment of the patient. Such interpretation process often implies that persons involved in it have to deal not only with the measurement data themselves but also with a pool of other information: for instance, additional measurement data (e.g. from previous measurements and/or from other medical imaging systems) can play a role as well as information of a more general kind: amongst these there count texts, be they in written form or provided as dictaphone texts.

In today's hospital practice, separate databases exist for texts (i.e. information data) and images (measurement data) as well as for other media. The databases come from different suppliers and thus have minimum interaction possibilities and facilities. Some hospital information system try to link such measurement and information data, however with limited success so far, because there is a lack of integration facilities and intelligent search capabilities over several different databases and media, i.e. measurement and information data.

Thus, also the annotation ontologies used to semantically describe and systemize both measurement data and information data are designed for such very specific media. The result is a separated system which cannot properly interact or be linked with other such systems:

For instance, image annotation ontology has been developed by the AIM project. This is described for instance in "Channin, David S. et al.: The caBIG Annotation and Image Markup Project. Journal of Digital Imaging 23, No. 2 April 2010, pp. 217-225", the entire contents of which are hereby incorporated herein by reference. This annotation ontology is purely based on manual input by a user so far and exclusively used for the annotation of image data. Other ontologies include the Foundational Model of Anatomy (FMA) and RadLex both of which are well-known ontologies to the expert. On the other hand, the RIS ("Radiological Information System"—a text database) stores reports and text in an unstructured manner. There are no annotations or linking possibilities given so far.

SUMMARY

At least one embodiment of the invention is directed to enhancing the possibilities of linking, i.e. assigning, measurement data to information data in such context.

According to at least one embodiment of the invention, the method comprises:

a) providing annotated measurement data in which, based on a first medical knowledge ontology, to a number of measurement data regions at least one measurement data finding each has been annotated, such that the measurement data regions together with their assigned measurement data findings form a first group of annotations, whereby a measurement data finding represents a parameter value related to the measurement data region to which it is annotated, b) providing annotated information data in which, based on a second medical knowledge ontology, to a number of information data regions at least one information data finding each has been annotated, such that the information data regions together with their assigned information data findings form a second group of annotations, whereby an information data finding represents a parameter value related to the information data region to which it is annotated, c) translating the first group of annotations into a first group of universal annotations and the second group of annotations into a second group of universal medical annotations in a universal annotation ontology management system such that all universal annotations of the first group of annotations have the same ontological basis as all universal annotations of the second group of annotations, d) comparing the universal annotations of the first group of universal annotations with the universal annotations of the second group of universal annotations based on features related to parameter values in the findings and/or to regions, and e) assigning those universal annotations to each other which have such common or similar features.

As for measurement data, these comprise all kinds of data acquired by a medical imaging system, i.e. in particular image data. Thus, it can be concluded that these measurement data result from an automatic and/or semi-automatic image-acquisition process in which a machine acquires the measurement data, based on commands by a radiologist or similar expert, and in which (in the case of a fully automatic acquisition process) the measurement data are then automatically supplied and possibly further proceeded by a machine (the same system or an additional system) as well.

As for information data, these comprise e.g. text data as mentioned in the introductory paragraphs. They can also comprise other measurement data from different measurements than those listed in the above paragraph, for instance derived from chemical and/or physical measurements. For instance, such information data can comprise test data from chemical tests of body liquids such as blood or urine. They can also comprise test data from cancer tests of tissue and/or information from measurements of extensions of body parts or of the complete body of the patient such as size, weight or the like.

Both the measurement data and the information data are now provided in an annotated form. Thereby, annotations are each based on an ontological basis of medical knowledge ontologies. In this context, the first and the second medical knowledge ontologies may be the same ontologies or different ones—which would typically be the case as judging from today's practice. The providing of the annotated measurement data and/or information data can be a simple input of annotated (measurement/information) data from an annotation system outside the assignment system according to the invention. The input may also be a manual input by a user, based on specific medical annotation ontology.

Once both the annotated measurement data and the annotated information data have been provided, the two groups of annotations are translated into a first and a second group of universal annotations. Such translation process is carried out in a universal annotation ontology management system which has access to a universal annotation ontology. This universal annotation ontology management system with its universal annotation ontology is realized such that the annotated (measurement and information) data coming from their specific annotation backgrounds can be transferred with the result of all annotations being in a universally understandable standard annotation form. This form is the prerequisite for the comparison in step d). This comparison step d) is further based on a comparison of features related to parameter values in the findings and/or a comparison of regions. That means that common or similar features are detected and thus universal annotations from the first group are matched with universal annotations from the second group. This matching is the assignment step in step e).

The method according to at least one embodiment of the invention can better be described by way of an example:

A radiologist controls a CT scan of a human chest. The resulting image data, i.e. measurement data, are automatically analyzed using a first annotation system. A particular spot in the image data representing the left lung is detected during the annotation process and provided with the following findings: "left lung, lesion, middle sized". That means that to the region within the image data, i.e. measurement data, there is linked a number of findings, be they identifying descriptions such as "left lung" or be they classifying findings. The findings all represent parameter values some of which refer to a position or a functional organ and some of which refer to (pre-) classifications. This annotation—possibly with a lot more similarly structured annotations—is put into a universal annotation ontology management system in step a).

The radiologist further writes a short statement of what he sees in the images. Thereby, using a different terminology, he states that the pulmonary structures on the left lung are possibly affected with cancer. A text parser extracts the expressions "pulmonary", "left lung structure" and "cancer" and joins them in an annotation which links the passage in the text with these words or with the respective text region. This annotation—again possibly together with a lot more similarly structured annotations—is put into the universal annotation ontology management system in step b). In step c) a translation engine in the universal annotation ontology management system translates each of the different expressions coming from the different ontologies into one expression, which may be an expression used in one of the two ontologies (or both) or a new—possibly encoded expression—for example into a sequence "lung system—left—cancer—size medium". These expressions or findings can now be compared in step d) and thus universal annotations from the first group assigned to universal annotations of the second group. Therefore, the text passage of the radiologist—due to the strong similarities in what it states—is linked to the region in the image concerning the left lung structure.

Such method basically uses the principle of a common ontological basis or "meta-ontology" which is laid over the single ontologies which have previously been used. Based on the common terminology of the universal medical annotation ontology a comparison of features in the individual universal annotations is possible and carried out using common or similar features. A common feature in this context would be considered to be exactly the same term in two findings—one of a universal annotation of a measurement datum, the other one of a universal annotation of an information datum.

In contrast, a similar feature contains some a parameter value which can be considered essentially common in some important respect wile being not exactly the same in both annotations. For instance, the term "lung" and the term "left lung" has in common the expression "lung", whereby the former excludes the more detailed indication of the latter. Thus, in an ontological hierarchy, the term "lung" can be considered to stand on a higher, less refined level of expression. Preferably using additional verification logics, the two terms in two different annotations can be matched and then assigned to each other. Thus, the universal annotation ontology preferably comprises such hierarchical structure in order to make possible such assignments along the hierarchical structure of a hierarchy of findings.

An assignment system of an embodiment comprises:

a) a first providing module realized to provide annotated measurement data in which, based on a first medical knowledge ontology, to a number of measurement data regions at least one measurement data finding each has been annotated, such that the measurement data regions together with their assigned measurement data findings form a first group of annotations, whereby a measurement data finding represents a parameter value related to the measurement data region to which it is annotated, b) a second providing module realized to provide annotated information data in which, based on a second medical knowledge ontology, to a number of information data regions at least one information data finding each has been annotated, such that the information data regions together with their assigned information data findings form a second group of annotations, whereby an information data finding represents a parameter value related to the information data region to which it is annotated, c) a universal annotation ontology management system which in operation translates the first group of annotations into a first group of universal annotations and the second group of annotations into a second group of universal annotations such that all universal annotations of the first group of universal annotations have the same ontological basis as all universal annotations of the second group of universal annotations, d) a comparison module which in operation compares the universal annotations of the first group of universal annotations with the universal annotations of the second group of universal annotations by detecting common or similar features related to parameter values in the findings and/or to regions, e) an assignment module which in operation assigns those universal annotations to each other which have such common or similar features.

In such assignment system the universal annotation ontology management system comprises or is connected to a universal medical annotation ontology, for instance supplied in an ontology database. Such universal medical annotation ontology may be a self-learning system or externally updated so that developments both in other ontologies "underneath" it and/or medical developments, for instance relating to new or refined diagnoses can be integrated in the ontology.

Any of the components of the assignment system, in particular the first and/or second providing module, the universal annotation ontology management system, the comparison module, and the assignment module, may each and possibly all of them be realized as software components on a processor, but also as hardware components or as a combination thereof.

Therefore, at least one embodiment of the invention also concerns a computer programme product directly loadable into a memory of a programmable device comprising software code portions for performing the steps of a method according to at least one embodiment of the invention when said product is run on the programmable device.

Further, at least one embodiment of the invention concerns a universal annotation ontology management system of the above-mentioned kind comprising:

a) a first input interface for receiving annotated measurement data from a first providing module in which first providing module, based on a first medical knowledge ontology, to a number of measurement data regions at least one measurement data finding each has been annotated, such that the measurement data regions together with their assigned measurement data findings form a first group of annotations, whereby a measurement data finding represents a parameter value related to the measurement data region to which it is annotated, b) a second input interface for receiving annotated information data from a second providing module in which second providing module, based on a second medical knowledge ontology, to a number of information data regions at least one information data finding each has been annotated, such that the information data regions together with their assigned information data findings form a second group of annotations, whereby an information data finding represents a parameter value related to the information data region to which it is annotated.

Thereby, the universal annotation ontology management system is realized such that in operation it translates the first group of annotations into a first group of universal annotations and the second group of annotations into a second group of universal annotations such that all universal annotations of the first group of universal annotations have the same ontological basis as all universal annotations of the second group of universal annotations.

Particularly advantageous embodiments and features of the invention are given by the dependent claims, as revealed in the following description. Thereby, features revealed in the context of the method may also be realized in the context of the assignment system and/or the universal annotation ontology management system and vice versa.

Generally, it is possible that the annotated measurement data and/or the annotated information data are supplied and only introduced in step a) and b), i.e. supplied to input interfaces of the assignment system. This implies that the respective providing module is realized as an input interface.

According to an example embodiment in step a) the measurement data are annotated and/or in step b) the information data are annotated. Such annotations are most preferably carried out automatically, i.e. based on automatic recognition or parsing algorithms rather than on human observations. However, an input of additional human observation comments is possible also in the context of an automatic annotation.

Therefore, the assignment system according to at least one embodiment of the invention in this example embodiment is realized such that the first providing module annotates the measurement data in operation and/or that the second providing module annotates the information data in operation. The first and second providing modules can thus include algorithm-based recognition systems, possibly connected to annotation databases, which automatically provide the annotations.

The assignment of universal annotations to data of different provenance, here to annotated measurement data and to annotated information data, to each other means that results are output in the form of combination data or assignment data. These combination data can be used in order to combine a display of the measurements data and of the information data and to visually link these data for a user. It is thus preferred that upon display of a region of the measurement data a corresponding region of the information data is displayed in parallel whereby the corresponding region is considered to be a corresponding region based on a result of the assignment, i.e. on the combination data. Such display in parallel of both regions is preferably carried out automatically and purely based on the combination data. However, human input can be used in addition, for instance to correct assignments and thus, in effect, to teach the assignment system in case of initial errors. Therefore, the assignment system itself is preferably realized as a self-learning system which in dependence of user inputs and/or of automatic inputs from other systems, adapts its behaviour of assignments accordingly.

In other words, once the measurement data, for instance an image of the body of the patient, are displayed to the user, he will also be supplied with the corresponding region of the information data and will get an indication which region in the measurement data is assigned to which region in the information data. In the context of the example referring to the lung as given above, this implies that upon pointing at a highlighted point within the lungs in an image derived from the measurement data where a first annotation system has detected a possibly cancerous spot, the user will get an automatic display of the text region referring to this spot. Both the text and the image region in this case can be connected for instance by an arrow and/or be highlighted in parallel in some visible way.

An assignment of universal annotations of the two different provenances is e.g. possible by including the information data into the measurement data, for instance as an image inside an image of the measurement data. However, it is preferred that the universal annotations assigned to each other are assigned by hyper-linking them in a computer-readable medium. Such hyper-linking techniques are well-known and make sure that the assignment can be observed from either way: if a particular passage in the information data is chosen by a user, he can find out that there is assignment to a particular region in the measurement data and the other way round. Such hyper-linking system therefore makes possible a universal access to the assignments based on well-known and established technologies.

As for the format of the universal annotations it is preferred that both universal annotations in the first group of universal annotations and in the second group of universal annotations are realized as vectors and that the comparison in step d) comprises a comparison of such vectors. A vector in this context need not necessarily be considered to be a vector in the mathematical sense, but may also be a combination of several information packets, for instance referring to a region on the one hand and to a number of findings on the other hand. However, the combination of regions and findings can also be encoded such that indeed coordinates of a vector in the mathematical sense can be derived from it. A comparison of vectors is particularly suitable in this case because it implies that several data within the vector can be compared within the universal annotations and at the same time a combination of these data within one annotation can be compared to a combination of data in the second vector. This means an overall higher security of the comparison with means that are relatively easy to employ.

As outlined before, the measurement data preferably comprise image data. Such image data can advantageously be analyzed by a learning algorithm based image parser module. Such a parser module is for instance described in "Seifert, S. et al.: Hierarchical Parsing and Semantic Navigation of Full Body CT Data. SPIE 2009". Such parser module thus provides the annotations of the image data on an automatic basis which in itself is based on a learning algorithm into which new medical findings and further refinements of an ontological structure can be integrated over time.

Image data can be supplied in the form of a number of single images, for instance representing different layers of a body section. However, they may also comprise moving images or other image sequence data. In this sense, the method according to the invention can be enhanced by including such image data which have previously not been annotated. This means that a practitioner gets extra information in an annotated form, which was not available before.

As mentioned above, the information data may for instance comprise text data. Such text data can be analogously analyzed by a text parser module. An example of such text parser module is given in: P. Daumke, S. Holste, S. Ambroz, M. Poprat, K. Simon, D. Marwede, E. Kotter: "Informationsextraktion aus radiologischen Befundberichten." GMDS 2010.

Such text data can comprise written text laid down in a text file, but they may also comprise (recorded) audio text data, for instance coming from a dictaphone device.

From these examples it is clear, that virtually all media can be used either to provide measurement data or to provide information data, or even both. The universal approach of the universal medical annotation ontology makes possible to integrate all such media data from different media as soon as the universal medical annotation ontology is matched with the underlying annotation ontology (or vice versa).

In order to make sure that some particular errors can be excluded during the assignment of universal annotations from different provenances, it can be particularly useful if it is made sure that the measurement data and the information data correspond to each other by referring to a same body region of the patient and/or by referring to a same patient study. By using data referring to the same body region of one patient it can be made sure that no rather silly confusions such as a confusion between arms and legs (both being extremities) are made. In particular, it is important, that findings only of one particular patient are matched so that the combination logic may include a test question which makes sure that both the measurement data and the information data refer to this same one patient.

What concerns the application of the assignment method only to one patient study, this implies that the measurement data and information data are dated close to each other, for instance (which is particularly preferred) that they have been recorded during one particular stay of the patient at a practitioner or a hospital. Again, it can be made sure that way that all data which are assigned to each other belong to only one single patient. This does not exclude the possibility to compare the measurement data and/or information data and indeed their correspondence to each other in a study with several patients. However, this step would be taken in the aftermath of carrying out the process of the method according to at least one embodiment of the invention. Thus, at least one embodiment of the invention supplies a possibility to provide a database of annotated and assigned measurement and information data which can be used in a comparative study amongst a number of patients.

Up to this point, a distinction between measurement data on the one hand and information data on the other hand has been made, whereby only measurement data of one kind and information data of another kind have been mentioned. However, it is the particular strength of the method and assigning system according to the invention to be universal because it is based on a universal medical annotation ontology. Therefore, it is also possible to include additional input from additional media, i.e. additional information data and/or additional measurement data from other sources, into the processes.

Thus, according to a particularly advantageous, because particularly universal, embodiment of the invention, additional measurement data from a second medical imaging system and/or additional information data apart from the previously mentioned information data are treated as outlined in the respective steps a) and b). This implies, that such additional measurement data are annotated or supplied in an annotated form and that such additional information data are also annotated or supplied an annotated form and then included in accordance with the process steps a) and/or b). That also means that more than just one assignment between measurement data and information data is possible but even multiple assignments amongst different measurement and/or information data are possible as well.

Additional measurement data can come for instance from a different modality, which means that for instance the first measurement data from the first medical imaging system come from CT system whereas the second measurement data from the second medical imaging system come from an MR system. Similarly, referring to information data, some information data may comprise a written text whereas other information data may comprise voice data. Any other combinations are certainly possible in this context. It may also be noted, that the information data may also comprise measurement data of a second medical imaging system.

Concerning the types of annotation and/or a universal annotations, these can comprise virtually any findings, i.e. information related to a selected region. It is thereby particularly preferred that an annotation and/or a universal annotation is at least one out of a group of anatomical annotations: these particularly comprise any of identifications of organs, blood vessels, tissue and bones. For instance, such annotations can comprise expressions such as "heart", "liver", "lung", "liver", "artery", "spine", etc.

spatial annotations: these comprise information concerning positions of particular regions within organs or body regions or the like. For instance, such annotations can comprise expressions such as "inside spleen", "lateral aorta", etc.

measurement annotations: these particularly comprise any references, for instance absolute references or relative references referring to sizes, spaces, an area content or a volume content and or sizes of boundaries of such areas or volumes. For instance, such annotations can comprise an expression such as "10 cm diameter", etc.

descriptive annotations: these include descriptions such as expressions like enlarged, small, cystic, cancerous or the like.

These four kinds of annotations, in particular of findings within annotations, help to identify a particular region within information data as well as within measurements data and to give a guideline to a practitioner concerning the relevance of a particular region for his attention.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the drawings, like reference numbers refer to like objects throughout. Objects in the diagrams are not necessarily drawn to scale.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
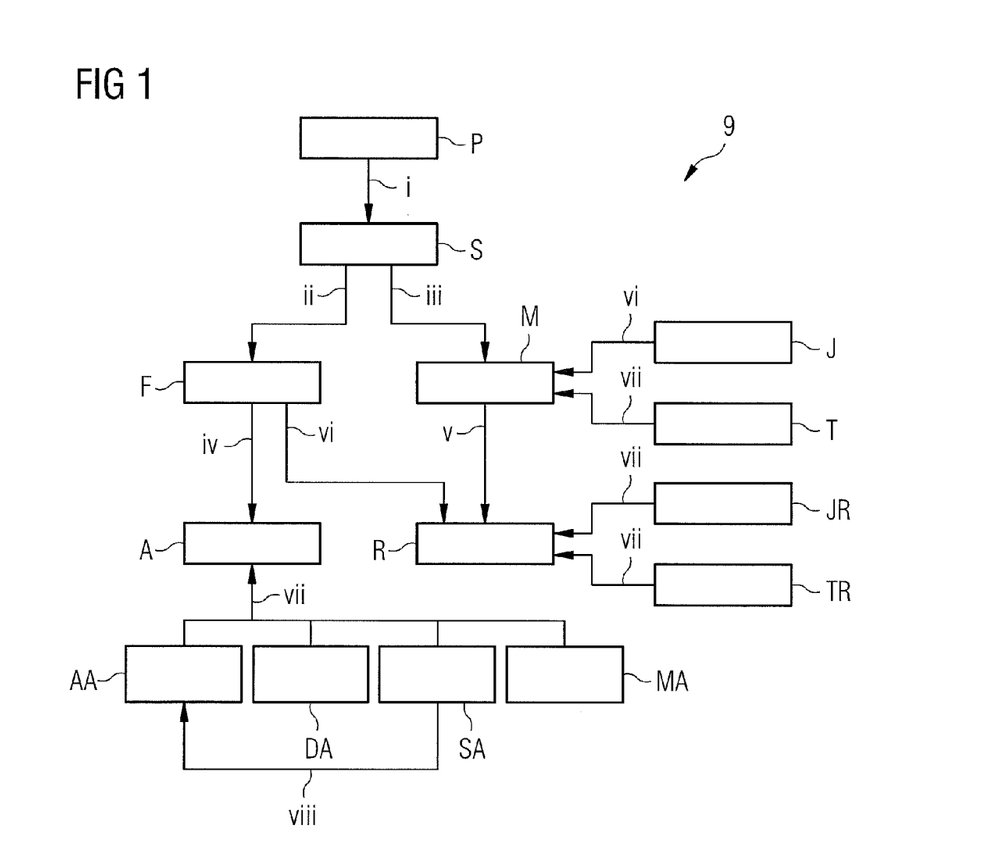
FIG. 1 shows a schematic block diagram of an inner structure a universal medical annotation ontology management system according to an embodiment of the invention.

FIG. 1 shows the structure of a universal medical annotation ontology management system 9 according to an embodiment of the invention. This can be used in a medical software application for radiologists. The data scheme features patient data of patient P derived from DICOM meta data, i.e. name, age etc. In addition, it features measurement data J from one or several medical imaging systems (modalities), information data T in the form of report texts T and annotation data A with findings F in an integrative view. The universal medical annotation ontology is designed with some abstract superclasses M, A, R which are media M, annotations A and representatives R.

The annotations A can comprise anatomical annotations AA, descriptive annotations DA, spatial annotations SA and measurement annotations MA as mentioned above. The blocks in the diagram are connected by arrows with specific meanings:
depiction i means "has study",
depiction ii means "has finding",
depiction iii means "has medium",
depiction iv means "has annotation",
depiction v means "has region",
depiction vi means "has representative"
depiction vii means "is"
depiction viii means "spatial relation to".

The data object "patient" P holds all information from DICOM meta data about a particular patient P, for instance name, age, etc. The patient P has for every clinical request one new study S, which holds information like an acquisition date, a clinical intention and so on.

All accumulated media M, for instance measurement data J, i.e. image data J, and information data T in the form of report texts T in one radiology examination are stored in the belonging study S with the property "has medium". As medium M different subtypes such as the measurement data J or the information data T are counted. In the study one can also find a list of findings F, which a user may be interested in. The findings have a list of representatives R which are defined as a measurement data region JR and/or as an information data region TR. The representative subtype measurement data region JR can be a defined region or position in the respective measurement data J and the subtype information data region TR is a region, fragment or a passage of belonging information data T such as text.

Furthermore, every finding F is specified by a list of annotations A as mentioned above.

The universal medical annotation oncology management system 9 provides the following technical features:

Firstly, the linking between different media is given because all representatives R have the same finding F and therefore also the same annotation A. If a user adds a new annotation A, the universal medical annotation ontology management system 9 will try to find an existing finding F by comparing the semantic annotations A and add the respective region R of the a new annotation A of the new measurement datum as a new representative R of the findings F.

A user can also compare the temporal progress of findings F because studies S have an acquisition date as temporal property. Therefore, the user can choose single findings F by comparing semantic annotations in different studies S and trace their measurements over the time.

The medium M can be any type of image or other media. Therefore, it is possible to examine multiple modalities and compare the different representatives R of the same finding F.

The universal medical annotation ontology management system 9 thus combines annotations A of different media, e.g. image and text, and links them the using the semantic knowledge of a universal medical annotation ontology. This enables the user to navigate between the universally annotated media not only over the time but also in multiple modalities and different types of media. Furthermore, it is possible to post-process the data or use the semantic universal annotations for a semantic search of all available medical media databases, e.g. PACS, RIS, etc. The result is a holistic universal annotation record not only of one patient study S, but over a number of patient studies S and even for a plurality of patients P. This database has linked universal annotations A to all media. The radiologist can get a fast pathology status in one examination he lists all findings F of one study S and filters them by typical pathology abnormalities for instance. This makes it possible to provide a more efficient reporting and investigation of temporal progression of a disease. It is also easy to generate structured reports, which are for instance important for post-processing by computer aided diagnosis systems or for semantically querying image databases.

Figure 2:
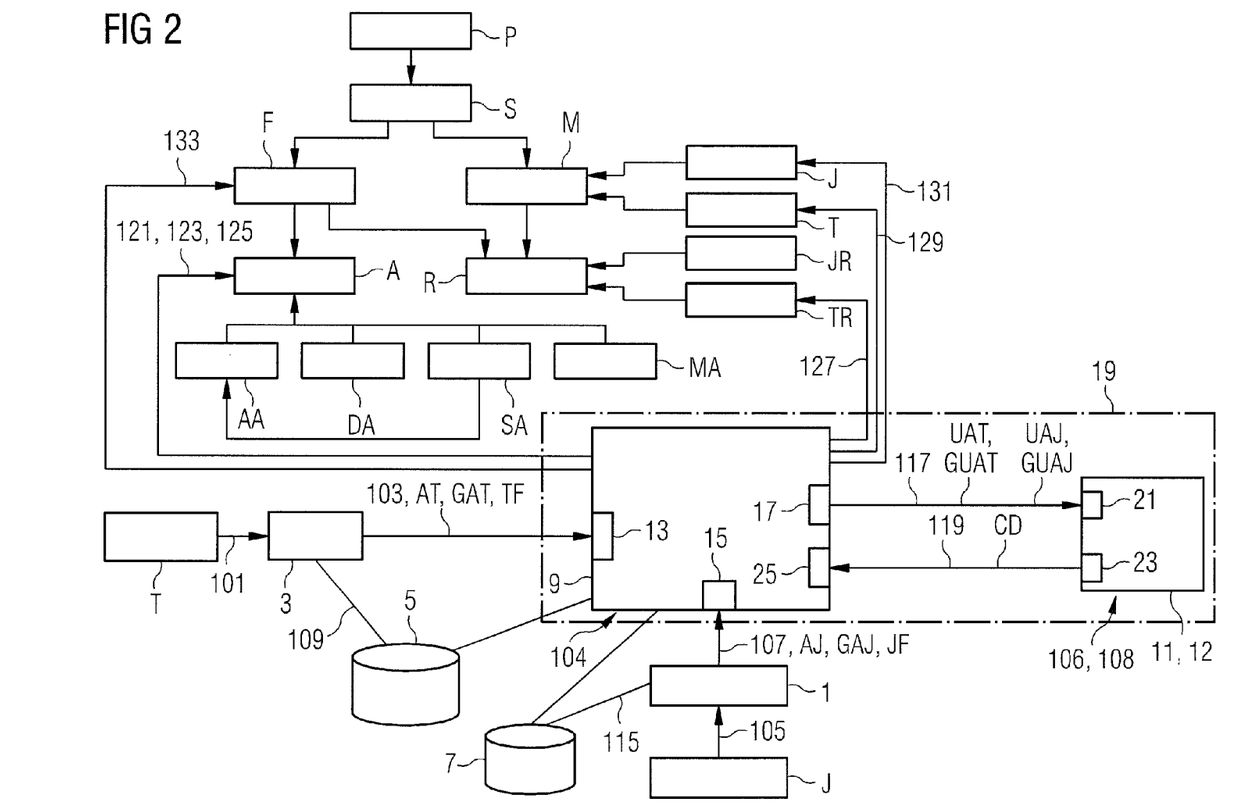
FIG. 2 shows a schematic block diagram of an assignment system according to an embodiment of the invention, using the universal medical annotation ontology management system of FIG. 1.

FIG. 2 shows a block diagram of an embodiment of an assignment system 19 according to an embodiment of the invention, in which there are also depicted the different steps of method according to embodiment of the invention.

The assignment system 19 of an embodiment comprises a universal medical annotation ontology management system 9 as described with reference to FIG. 1 and a comparison module 11 together with an assignment module 12 comprised in one common unit. The universal medical annotation ontology management system 9 comprises several input and output interfaces 13, 15, 17, 25, namely a first input interface 13 realized to receive annotated information data AT, a second input interface 15 realized to receive annotated measurement data AJ, an output interface 17 realized to output universally annotated information data UAT and universally annotated measurement data UAJ. The first input interface 13 can thus be considered to be a first providing module 13 for providing annotated measurement data AJ, the second input interface 15 analogously to be a second providing module 15 for providing annotated information data AT.

A third input interface 25 is realized to receive combination data CD. The unit comprising the comparison module 11 and the assignment module 12 comprises an input interface 21 for receiving universally annotated information data UAT and universally annotated measurement data UAJ. The unit also comprises an output interface 23 to output combination data CD.

The drawing also depicts an image parser 1 which generates annotated measurement data AJ and a text parser 3 for which generates annotated information data AT. The image parser 1 is connected to a first medical knowledge ontology database 7 and the text parser 3 is connected to a second medical knowledge ontology database 5.

The functions of the above-mentioned elements within or without the assignment system 19 are now described with references to the steps of an embodiment of the method according to the invention:

In a first step 105 measurement data J are supplied and processed in the image parser 1 supported by an input 115 from the first medical knowledge ontology database 7 so that therefrom result annotated measurement data AJ, actually a group of annotated measurement data GAJ. In the annotated measurement data AJ measurement data findings JF have been assigned to specific measurement data regions JR. These annotated measurement data AJ are then input into in a second step 107 via the second input interface 15 into the universal medical annotation ontology management system 9 where they are further processed.

Analogously in a third step 101 information data TR analyzed in the text parser 3, supported by input 109 from the second medical knowledge ontology database 5 so that therefrom result annotated information data AT. Again, these can be grouped in a group of annotated measurement data GAT with information data findings TF referring to information data regions TR. These annotated information data AT are input via the first input interface 13 in a fourth step 103 into the universal medical annotation ontology management system 9 and further processed there.

There, in a step 104, the annotated measurement data AJ and the annotated information data AT respectively the groups GAJ and GAT are processed into universally annotated measurement data UAJ and universally annotated information data UAT or groups GUAJ, GUAT thereof.

Via the output interface 17 these groups of universally annotated information data GUAT and of universally annotated measurement data GUAJ are passed on in a sixth step 117 via the input interface 21 into the comparison module 11 and later into the assignment module 12. The comparison module 11 in a seventh step 106 compares the groups of universally annotated measurement data GUAJ with the groups of universally annotated information data GUAT. Resulting from this comparison 106 the assignment module 12 in step 108 assigns selected universal annotated measurement data UAJ to selected universally annotated information data UAT the technical features of which match to a sufficient degree. This means that they are the same or very similar, as described above. Therefrom result combination data CD which—in an ninth step 119 are passed back into the universal medical annotation ontology management system 9 via its third input interface 25.

In the universal medical annotation ontology management system 9 the universal annotated measurement data UAJ are integrated in a step 121 into the annotations A (cf. FIG. 1—also in the following), as well as the universal annotated information data UAT in a step 123 and the combination data CD in a step 125. In a step 133 the measurement data findings JF and the information data findings TF are introduced into that part of the universal medical annotation ontology management system 9 which contains the findings F.

Three more steps 127, 129 include the introduction 127 of the measurement data regions JR and information data regions TR into the respective region sub-class of the universal medical annotation ontology management system 9 as well as the integrations 129, 131 of the measurement data J and of the information data T into the respective subclass of the class medium M.

In this context it may be noted, that the image parser 1 or the text parser 3 may be part of the assignment system 19 according to the invention but need not necessarily be. In the first case they can also be considered to be first and second providing modules in the above-mentioned sense.

An annotated measurement datum contains a measurements data region JR and a number of measurements data findings JF, which may include a number of medical terms MT. This combination of measurement data regions JR and measurement data findings JF, in particular of medical terms MT, which comprise parameter values referring to the respective measurement data region JR, can be considered to be a vector. This vector can be considered to have the following form:

$$AJ=(JR,JF(MT_1,MT_2, \ldots ,MT_n))$$

With n being the number of medical terms.

A group of annotated measurement data GAJ thus comprises a number of annotated measurement data AJ which can be depicted as follows:

$$GAJ=(AJ_A,AJ_B, \ldots ,AJ_Z)$$

Z being the number of available annotated measurement data AJ.

The same structure can be assigned to the annotated information data so that their vector has the following appearance:

$$AT=(TR,TF(MT_1,MT_2, \ldots ,MT_n))$$

With n being the number of medical terms.

A group of annotated information data GAT thus comprises a number of annotated information data AT which can be depicted as follows:

$$GAT=(AT_A,AT_B, \ldots ,AT_Z)$$

Z being the number of available annotated information data AT.

Those groups are transferred into two groups of universal annotated measurement data GUAJ and universal annotated information data GUAT which basically have the same structure as described above with the difference that the expressions for those regions and findings can be matched with respect to both groups GUAJ, GUAT. The combination data CD resulting from the assignment process 108 in the assignment system 12 can be considered to be an intersection of the group of universal annotated measurement data GUAJ and the group of universal annotated information data GUAT. They are therefore in a form which is essentially as follows:

$$CD=GUAT \cap GUAJ==\{(JR1,TR1),(JF1,TF1),(JR2,TR2),(JF2,TF2), \ldots ,(JRn,TRn),(JFn,TFn)$$

With n being the number of available matches of universal annotated measurement data UAJ and universal annotated information data UAT.

Figure 3:
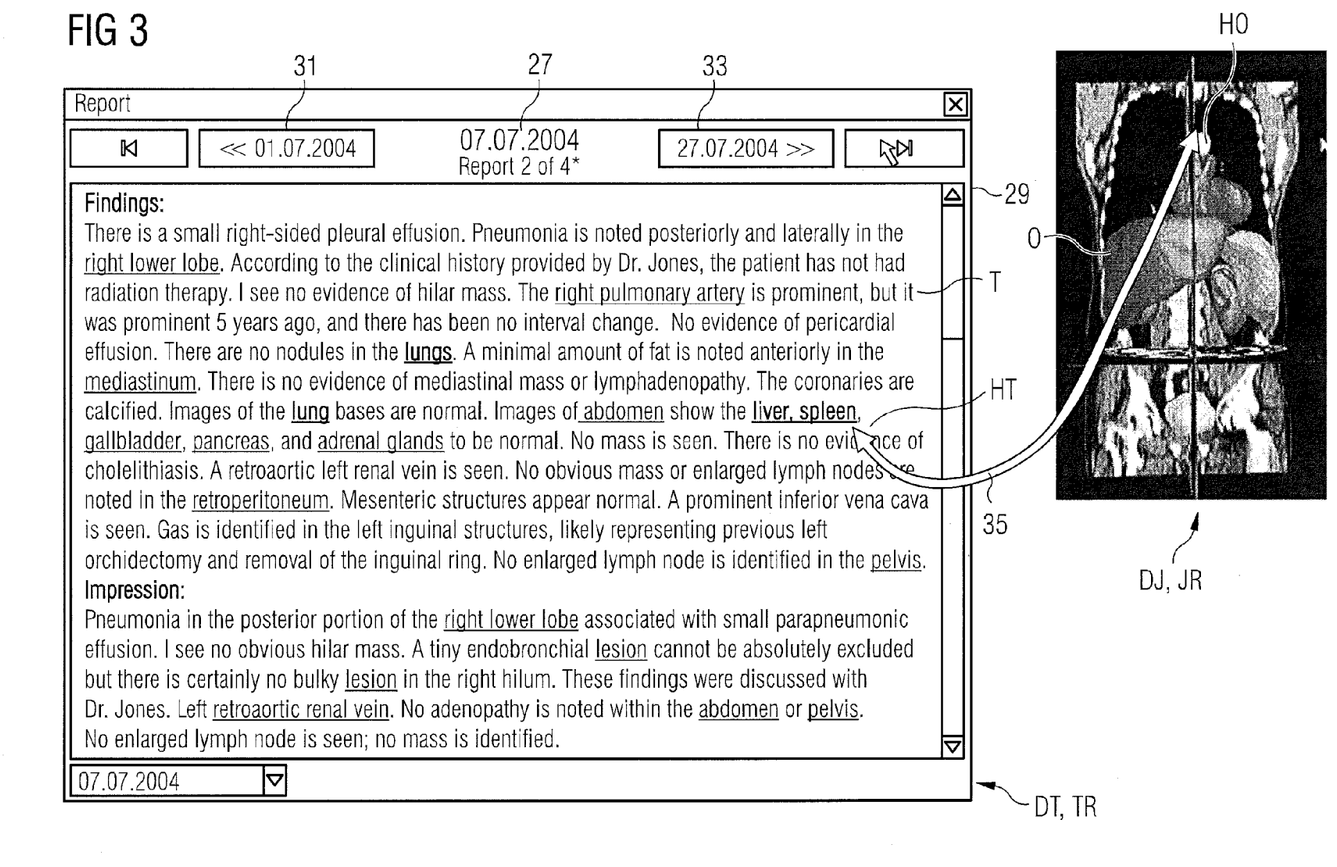
FIG. 3 shows a depiction of a display of measurement data and of information data based on an embodiment of a method according to the invention.

Reference is now made to FIG. 3: here, measurements data J and information data T are displayed in the form of a display DJ of measurement data J and a display DT of information data T. What is shown here are a particular measurements data region JR at the right-hand side and a particular information data region TR at the left-hand side.

The display DJ of measurement data J shows a human abdomen of a patient P in the form of a slice from CT image data. On the left-hand side the display DT of information data T shows text T which has been dictated by a practitioner. Above the text there are arranged several interaction buttons 27, 31, 33 which are all included inside a depiction window 29. A first button 27, which is actually activated refers to a report of 7 Jul. 2004, whereas a second button 31 refers to a previous report of 1st July the same year and a third button 33 refers to a third report of 27th July the same year. This means that by selecting one of these three buttons 27, 31, 33 a user can select a particular report.

The texts T have been annotated by using the method according to the invention. Therefore some text regions TR are highlighted which shows that they have corresponding image regions JR or measurement data regions JR, in the right-hand side image DJ. One particular highlighted text HT is currently selected by a user and thus an arrow 35 connects this highlighted text HT within a highlighted object HO within the displayed measurement data DJ. Upon selecting different highlighted texts a different connection to other regions within the measurements data depiction DJ will be activated. This way a user can navigate through text and/or through image regions TR, JR and thus always find corresponding text and image regions TR, JR from the two different sources of information, i.e. the measurement data J on the one hand and the information data T on the other hand.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of assigning measurement data of a body of a patient, the measurement data having been accumulated by a first medical imaging system, to information data related to the body or vice versa, the method comprising:
   a) providing annotated measurement data to a number of measurement data regions of an image acquired by the first medical imaging system, the annotated measurement data having a first medical knowledge ontology, at least one measurement data finding including at least one first assessment of one of the measurement data regions that is annotated in each of the measurement data regions, such that the measurement data regions together with the respective assigned measurement data findings form a first group of annotations, each of the measurement data findings representing a parameter value related to the corresponding measurement data region to which it is annotated;
   b) providing annotated information data to a number of information data regions associated with the image, the annotated information data having a second medical knowledge ontology, at least one information data finding of the information data regions including at least one second assessment of the one of the measurement data regions that is annotated in each of the information data regions, such that the information data regions together with respective assigned information data findings form a second group of annotations, each of the information data findings representing a parameter value related to the corresponding information data region to which it is annotated;
   c) translating the first group of annotations into a first group of universal annotations and the second group of annotations into a second group of universal medical annotations in a universal annotation ontology management system such that all universal annotations of the first group of annotations have the same ontological basis as all universal annotations of the second group of annotations;

d) comparing the first group of universal annotations with the second group of universal annotations;

e) determining, based on the comparing, an intersection of parameter values between parameter values of the measurement data findings and parameter values of the information data findings;

f) outputting the determined parameter values to visually link the information data regions to the measurement data regions on the image; and g) concurrently displaying the visually linked information data regions and measurement data regions on the image.

2. The method according to claim 1, wherein at least one of in step a), the measurement data are annotated, and in step b) the information data are annotated.

3. The method according to claim 1, wherein the universal annotations assigned to each other are assigned by hyperlinking them in a computer-readable medium.

4. The method according to claim 1, wherein universal annotations in the first group of universal annotations and in the second group of annotations are realized as vectors and the comparison in step d) comprises a comparison of the vectors.

5. The method according to claim 1, wherein the measurement data comprise image data which are analyzed by a learning algorithm based image parser module.

6. The method according to claim 5, wherein the image data comprise image sequence data.

7. The method according to claim 1, wherein the information data comprise text data, which are analyzed by a text parser module.

8. The method according to claim 7, whereby the text data comprise audio text data.

9. The method according to claim 1, wherein the measurement data and the information data correspond to each other at least one of by referring to a same body region of the patient and by referring to a same patient study.

10. The method according to claim 1, wherein at least one of additional measurement data from a second medical imaging system and additional information data apart from the information data are treated as outlined in the respective steps a) and b).

11. An assignment system for assigning measurement data of a body of a patient, the measurement data having been accumulated by a medical imaging system, to information data related to the body or vice versa, the assignment system comprising:

a processor configured to execute computer readable instructions such that the processor is configured to, provide annotated measurement data to a number of measurement data regions of an image acquired by the medical imaging system, the annotated measurement data having a first medical knowledge ontology, at least one measurement data finding including at least one first assessment of one of the measurement data regions that is annotated in each of the measurement data regions, such that the measurement data regions together with the respective assigned measurement data findings form a first group of annotations, each of the measurement data findings representing a parameter value related to a corresponding measurement data region to which it is annotated, provide annotated information data to a number of information data regions associated with the image, the annotated information data having a second medical knowledge ontology, at least one information data finding of the information data regions including at least one second assessment of the one of the measurement data regions that is annotated in each of the information data regions, such that the information data regions together with respective assigned information data findings form a second group of annotations, each of the information data findings representing a parameter value related to a corresponding information data region to which it is annotated, translate the first group of annotations into a first group of universal annotations and translate the second group of annotations into a second group of universal annotations such that all universal annotations of the first group of universal annotations have the same ontological basis as all universal annotations of the second group of universal annotations, compare the first group of universal annotations with the second group of universal annotations, determine, based on the comparison, an intersection of parameter values between parameter values of the measurement data findings and parameter values of the information data findings, and output the determined parameter values to visually link the information data regions to the measurement data regions on the image;

wherein the visually linked information data regions and measurement data regions are displayed concurrently.

12. An assignment system according to claim 11, wherein at least one of the first provider is configured to annotate the measurement data in operation and the second provider is configured to annotate the information data in operation.

13. A universal annotation ontology management system for assigning measurement data of a body of a patient, the measurement data having been accumulated by a medical imaging system to information data related to the same body or vice versa, the universal annotation ontology management system comprising:

a processor configured to execute computer readable instructions such that the processor is configured to, receive annotated measurement data from a first providing module, the annotated measurement data corresponding to a number of measurement data regions in which at least one measurement data finding includes at least one first assessment of one of the measurement data regions that is annotated in each of the measurement data regions, the measurement data regions having a first medical knowledge ontology and being of an image acquired by a medical imaging system, the measurement data regions together with their assigned measurement data findings forming a first group of annotations, each of the measurement data findings representing a parameter value related to the corresponding measurement data region to which it is annotated, receive annotated information data from a second providing module, the annotated information data corresponding to a number of information data regions in which at least one information data finding of the information data regions includes at least one second assessment of the one of the measurement data regions, the at least one second assessment being annotated in each of the information data regions, the annotated information data having a second medical ontology and being associated with the image, the information data regions together with their assigned information data findings forming a second group of annotations, each of the information data findings representing a parameter value related to the corresponding information data region to which it is annotated, translate the first group of annotations into a first group of universal annotations and the second group of annotations into a second group of universal annotations such that the universal annotations of the first group of universal annotations have the same ontological basis as the universal annotations of the second group of universal annotations, compare the first group of universal annotations with the second group of universal annotations, determine, based on the comparison, an intersection of parameter values between parameter values of the measurement data findings and parameter values of the information data findings, and output the determined parameter values to visually link the information data regions to the measurement data regions on the image;

wherein the information data regions and the measurement data regions are concurrently displayed.

14. A non-transitory computer readable medium including program segments for, when executed on a computer device, causing the computer device to implement the method of claim 1.

* * * * *